Figure 8:
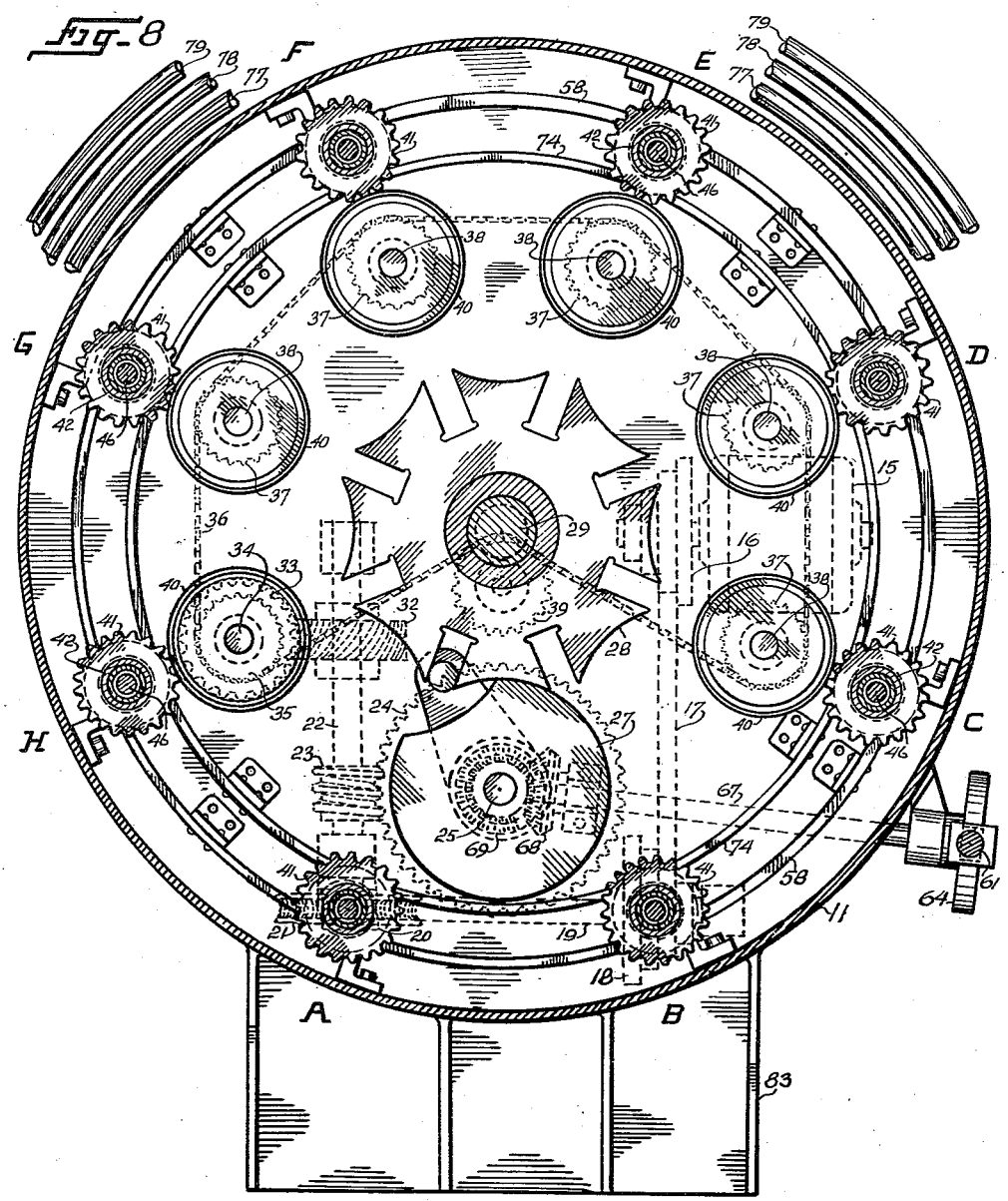

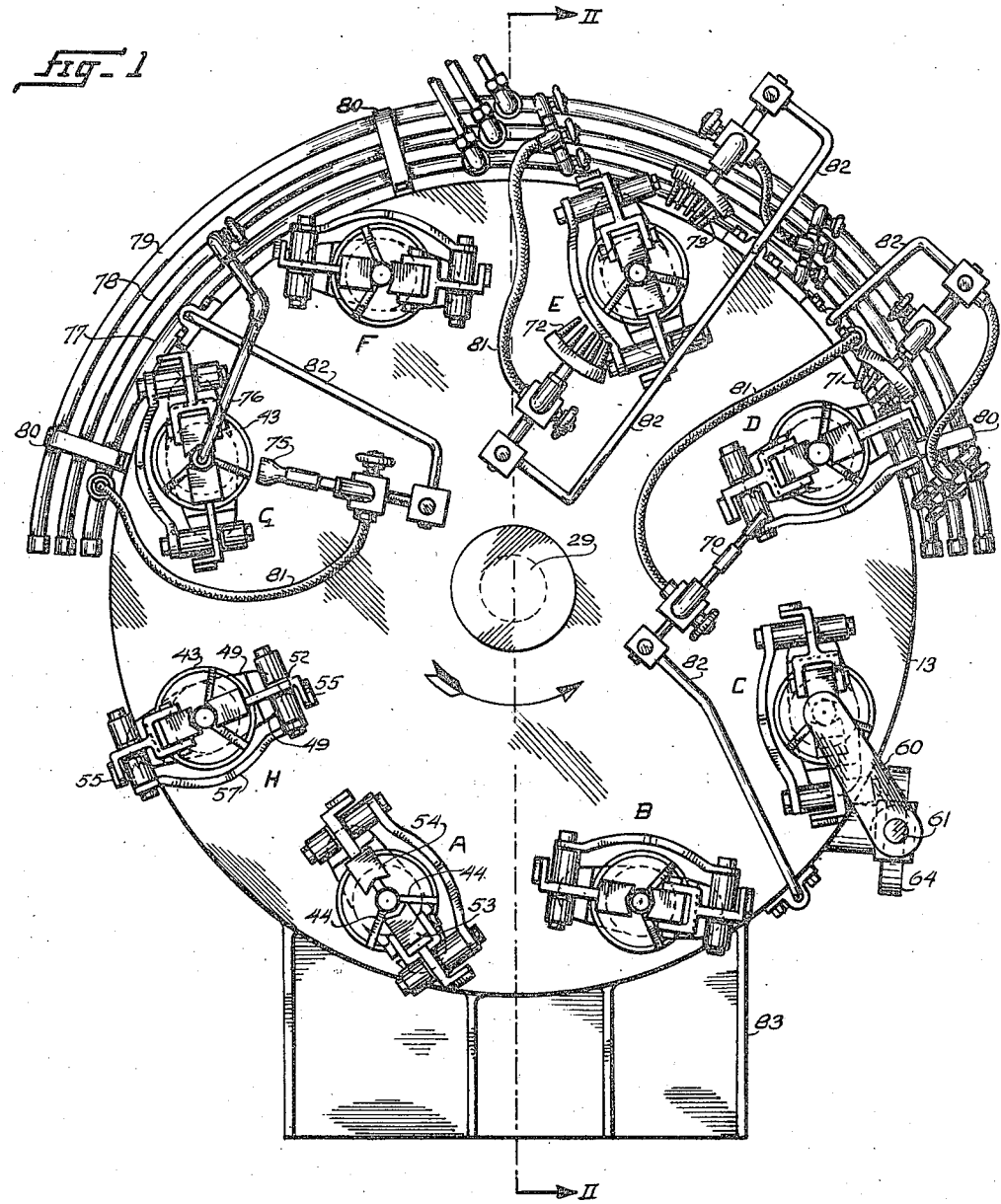

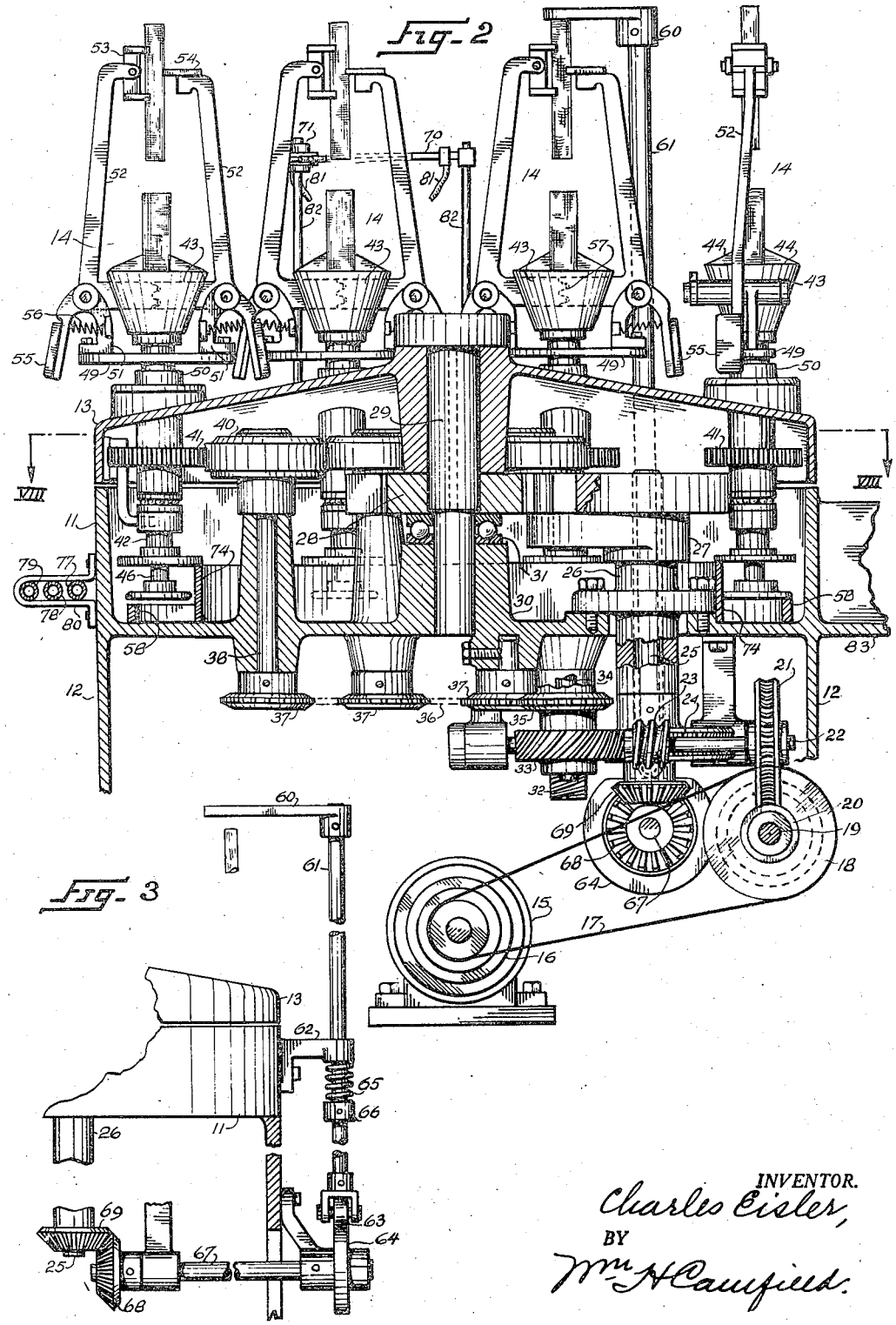

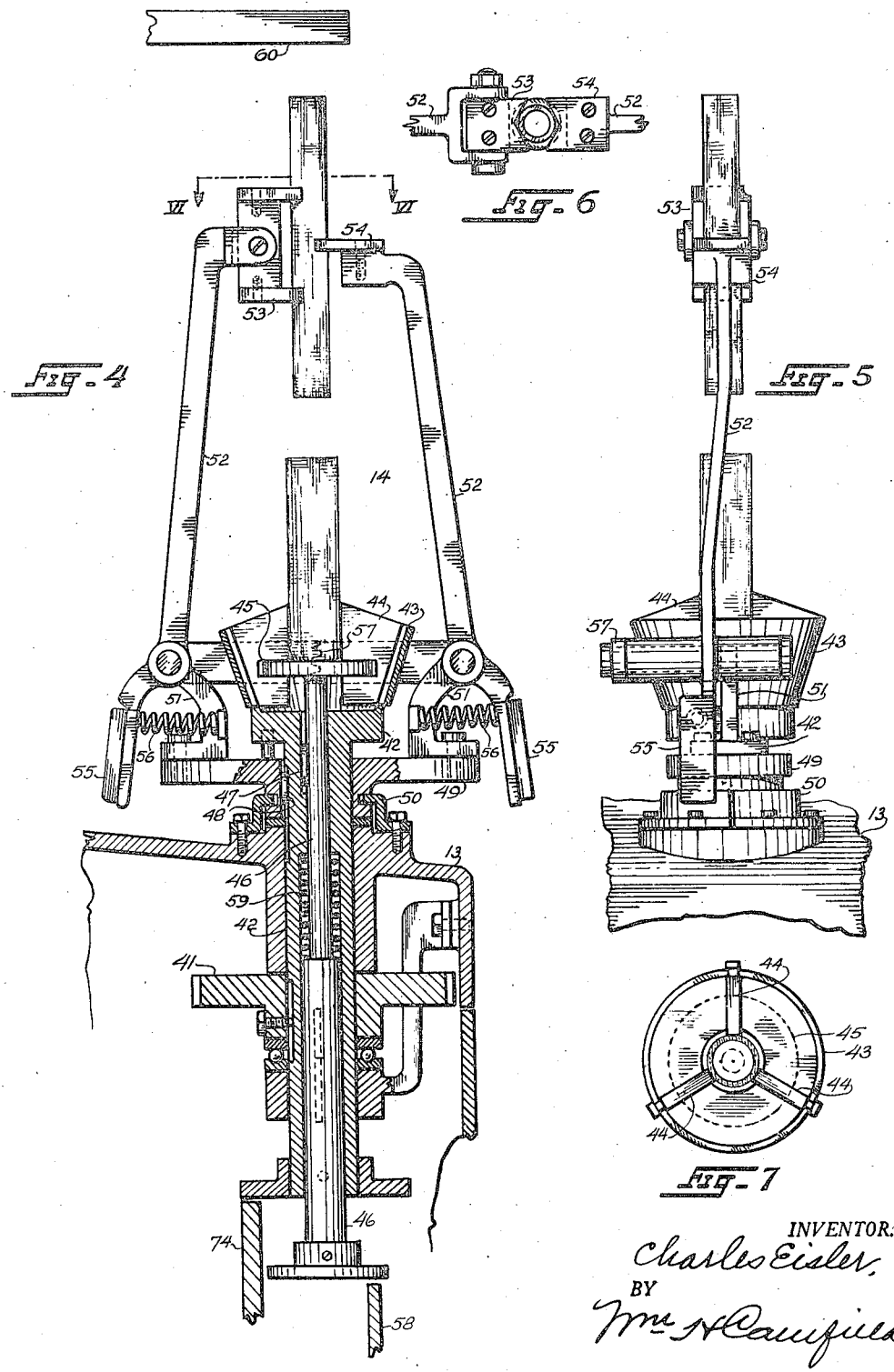

Aug. 24, 1948.  C. EISLER  2,447,569
TUBULATING MACHINE
Filed Jan. 20, 1944   5 Sheets-Sheet 5
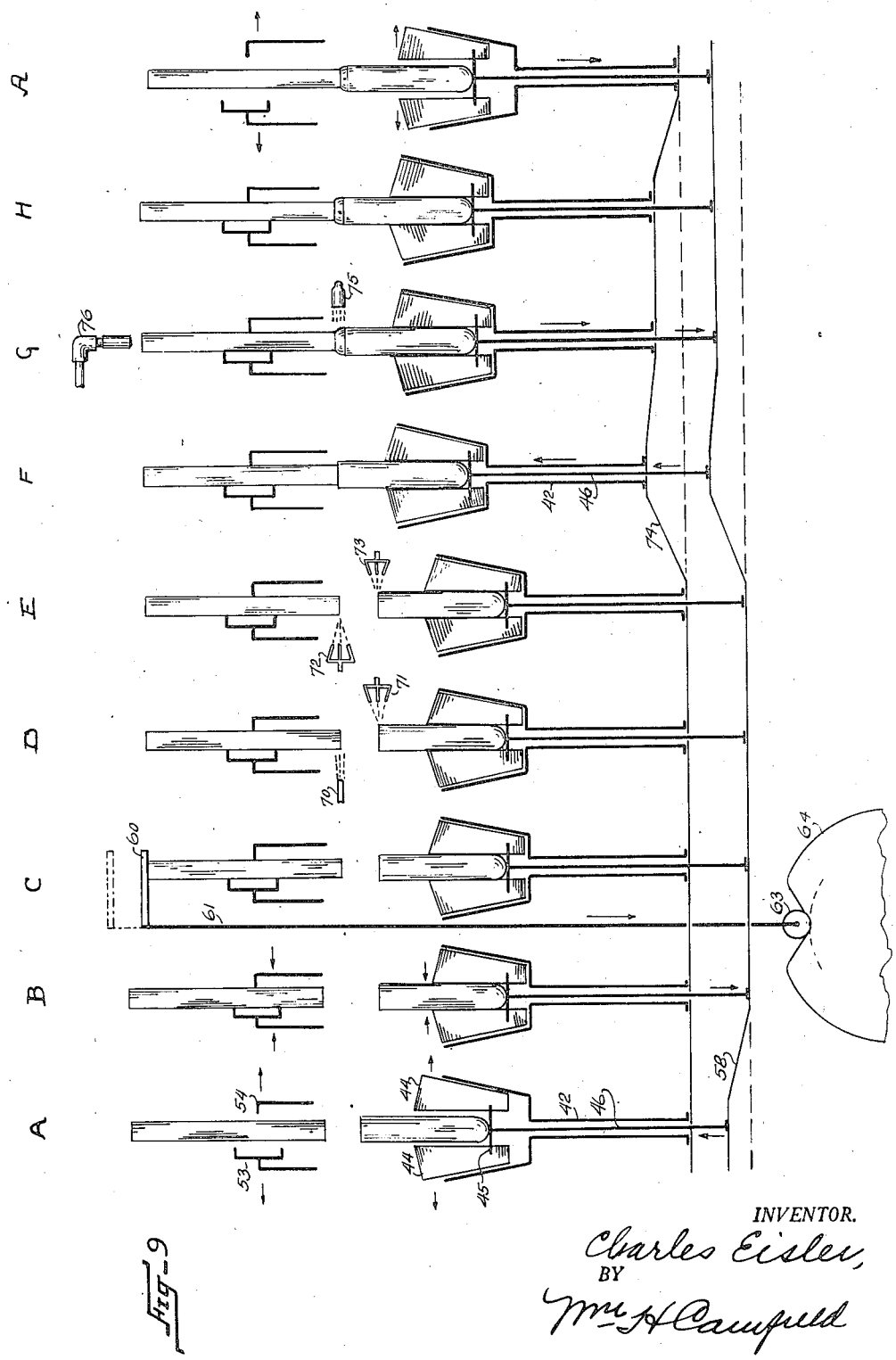
INVENTOR.
Charles Eisler,
BY
Wm H Campfield Patented Aug. 24, 1948

2,447,569

UNITED STATES PATENT OFFICE 2,447,569

TUBULATING MACHINE

Charles Eisler, South Orange, N. J.

Application January 20, 1944, Serial No. 519,062

2 Claims. (Cl. 49—1)

This invention relates to a machine for joining glass tubes of different diameters end to end and modifying the joint so made to provide a joint of improved appearance that is also of a shape to make a more stable joint.

The invention also provides for a modification of the joint to form an outwardly curved or partially globular conformation that eliminates internal stresses at the glass of the joint with the result that there is no weakness in the glass at that portion of the tube and no breakage due to the subsequent cooling of the product after the joining in a plastic condition.

The invention also relates to various details of construction that are embodied in the machine for carrying out the operations which result in the more reliable and less wasteful method than those heretofore employed.

The invention is illustrated in the accompanying drawings in which Figure 1 is a top view of the machine. Figure 2 is a cross section taken substantially on line II—II in Figure 1. Figure 3 is a detail of Figure 2 showing the means for positioning the upper glass tube. Figure 4 shows the detail of the sealing head with reference to the cam tracks. Figure 5 is another view of the sealing head. Figure 6 is a fragmentary plan view taken on line VI—VI of Fig. 4 and illustrates the cross sectional relation of the glass tube in the sealing head. Figure 7 shows the glass tube of larger diameter in the chuck. Figure 8 is a top view of the base of the machine taken on line VIII—VIII of Fig. 2 showing the means for rotating the spider and the sealing heads. Figure 9 shows, diagrammatically, the step-by-step operations of the joining of the two glass tubes.

The machine is supported on a base 11 including the support 12, the spider 13 and having the rotating sealing heads 14, the spider and the sealing heads being actuated by a motor 15 which is mounted below the base. The motor has the driving pulley 16 which, by means of the belt 17 drives the counter pulley 18 on the shaft 19. On the shaft 19 is mounted the worm 20 which drives the worm wheel 21 on the shaft 22, and on shaft 22 is also mounted the worm 23 which drives the worm gear 24 mounted on the vertical shaft 25 journalled in the bearing 26. On the vertical shaft 25 is mounted the Geneva driver 27 which actuates the Geneva wheel 28 keyed on the spider shaft 29 and which is journalled in the hub 30 of the base 11, the ball-bearings 31 being interposed between the Geneva wheel and the hub 30.

The spider 13 advances from station to station at every revolution of the Geneva driver. The stations, starting with the loading position are consecutively designated by A, B, C, D, E, F, G and H. While the spider is advancing from one station to the next one, the sealing heads are inactive. They revolve only at the stops at the stations C to H by the following means: On shaft 22 is keyed the spiral gear 32 meshing with the spiral gear 33 mounted on the vertical shaft 34. On shaft 34 is mounted the driving sprocket 35 at station H, which, by chain 36 drives the sprockets 37 mounted on the shafts 38 at the corresponding stations, except stations A and B, where the chain passes over the idler sprocket 39. Mounted on the sprocket shafts 38 are the rubber rollers 40 at stations C to H, which frictionally engage the sprockets 41 on the sealing head chuck shafts 42. The chucks 43 have the jaws 44 which are opened or closed by the lift plate 45 integral with the lift shaft 46 which is rotatable with the chuck shaft 42 and slidable therein by such means as key 47. Rotatable with the chuck by the sliding key 48 is the support 49 mounted on the spider 13 by the split retaining ring 50.

On the support 49 are the brackets 51 in which are pivoted the jaw arms 52 provided with the self-aligning jaws 53 and 54, the jaws being manually operated by the levers 55 against the influence of the jaw closing springs 56, the levers being provided with the meshing gear segments 57 to insure the simultaneous movement of the jaws 53 and 54.

The sequence of operations is illustrated in Figure 9. At the loading station A, the lift shaft 46 is raised by the cam track 58 which opens the jaws 44 of the chuck, the chuck maintaining its normal position with reference to the spider. The glass tube of the greater diameter is then placed in the chuck while the glass tube of lesser diameter is placed in the upper jaws 53 and 54, the chuck being closed when the lift rod 46 is urged in the following contact with the descending slope of the cam track 58 by the compression spring 59, at station B. At station C the upper glass tube is positioned vertically by the arm 60 mounted on the arm or lift rod 61 slidable in the bracket 62 which is secured to or integral with the base 11. The rod 61, provided with the cam roller 63 is kept in contact with the cam 64 by the spring 65 interposed between the bracket 62 and the fixed collar 66. The cam is mounted on shaft 67 operated by the miter gear 68 meshing with 69 mounted on an extension of the Geneva drive shaft 25.

After positioning the upper glass tube the sealing head is moved to station D, both tubes there glazed by the burners 70 and 71 and at station E the required degree of plasticity is secured by the burners 73 and 72. At station F the lower tube is brought in contact with the upper tube, or substantially so, by raising the chuck shaft 42 and the jaw lift shaft 46 in unison by the equal rise in the cam tracks 58 and 74 and both tubes are fused together.

At station G the chuck is lowered to a limited extent by a corresponding dip in both cam tracks and the fused neck of the joined glass tubes is lightly elongated while being subjected to a moderate fire from the burner 75, compressed air being admitted into the joined tubes by the air nozzle 76. The air under pressure, when so admitted causes the elongated neck, which would otherwise be flatly tapered, to be pressed outwardly to form a partly globular or rounded juncture. Cooling of the joined tubes takes place at station H. The chuck is opened on its way from H to A by a dip in the track 74 which brings the chuck back to its original level at A, and the joined tubes are removed, after manually opening the jaws 53 and 54.

The machine is provided with the usual gas, air, and oxygen supply pipes 77, 78 and 79 respectively, supported on the base 11 by the brackets 80, which pipes communicate with the main supply sources in the usual manner and are connected with the burner mixers by the tubes 81, the burners being supported by the stands 82 which are secured to the base. Integral with the base at the loading and unloading side of the table is the tray 83 with a suitable number of compartments for holding unfinished and finished glass tubes.

It will be evident that the admission of air by means of the nozzle 76 causes a rounding and finishing of the joint between the tubes and that this feature imparts a strengthening shape to the joint which withstands internal stresses in the cooling period and afterward. While the description is directed to the placing of the larger diameter tube in the bottom chuck the tubes can be inserted with the smaller tube at the bottom if desired.

I claim:

1. A chuck for uniting a pair of sections of tubing in a tubulating machine having a spider, said chuck comprising a support member, a retaining ring engaging said support member and spider to mount the support member on the spider, a pair of brackets mounted on said support member in opposed, spaced relation, jaw arms pivoted to said brackets, jaws on said arms, adapted to hold a section of tubing therebetween in position for uniting with a second section of tubing, a chuck, a chuck shaft on said chuck, keying means engaging said chuck shaft and support to slidably and rotatably key the same together, jaws in said chuck adapted to hold said second section of tubing therebetween, a lift plate engaging said jaws and supporting said second section of tubing in said jaws, said lift plate being adapted to move the jaws into and out of said chuck so that said jaws will respectively engage and disengage said second section of tubing, a lift shaft depending from said plate, and means to slidably and rotatably key the lift shaft to said chuck shaft, said lift shaft being adapted to move the jaws out of the chuck to carry the second section of tubing into engagement with the first mentioned section of tubing.

2. A chuck for uniting a pair of sections of tubing in a tubulating machine having a spider, said chuck comprising a support member, means engaging said support member and spider to mount the support member on the spider, jaw arms, means to pivot the jaw arms to said support, jaws on said arms, adapted to hold a section of tubing therebetween in position for uniting with a second section of tubing, a chuck, a chuck shaft on said chuck, means engaging said chuck shaft and support to slidably and rotatably key the same together, jaws in said chuck adapted to hold said second section of tubing therebetween, a lift plate engaging said jaws and supporting said second section of tubing in said jaws, said lift plate being adapted to move the jaws into and out of said chuck so that said jaws will respectively engage and disengage said second section of tubing, a lift shaft depending from said plate, and means to slidably and rotatably key the lift shaft to said chuck shaft, said lift shaft being adapted to move the jaws out of the chuck to carry the second section of tubing into engagement with the first mentioned section of tubing.

CHARLES EISLER.

REFERENCES CITED

The following references are of record in the file of this patent:

UNITED STATES PATENTS

| Number | Name | Date |
| --- | --- | --- |
| 1,621,359 | Fagan et al. | Mar. 15, 1927 |
| 1,742,153 | Stiles | Dec. 31, 1929 |
| 1,813,105 | Wetmore | July 7, 1931 |
| 2,023,628 | Van Sant | Dec. 10, 1935 |
| 2,151,840 | Dichter | Mar. 28, 1939 |

FOREIGN PATENTS

| Number | Country | Date |
| --- | --- | --- |
| 363,916 | Great Britain | Dec. 31, 1931 |
| 368,419 | Great Britain | Mar. 10, 1932 |